(12) United States Patent
Kim et al.

(10) Patent No.: US 7,656,484 B2
(45) Date of Patent: Feb. 2, 2010

(54) METHOD AND APPARATUS FOR FORMING ALIGNMENT LAYER FOR LIQUID CRYSTAL DISPLAY

(75) Inventors: Chang Dong Kim, Seoul (KR); Hyun Sik Seo, Anyang-si (KR); Kwang Hoon Shin, Seoul (KR); Dae Hyun Nam, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 455 days.

(21) Appl. No.: 11/289,413

(22) Filed: Nov. 30, 2005

(65) Prior Publication Data

US 2006/0176431 A1    Aug. 10, 2006

(30) Foreign Application Priority Data

Feb. 7, 2005    (KR) .................... 10-2005-0011316

(51) Int. Cl.
*G02F 1/1337* (2006.01)
(52) U.S. Cl. ...................................... 349/124
(58) Field of Classification Search ................ 349/124
See application file for complete search history.

(56) References Cited

U.S. PATENT DOCUMENTS 4,892,392 A * 1/1990 Broer .......................... 349/124
5,438,421 A * 8/1995 Sugawara et al. ............ 349/123
5,604,615 A * 2/1997 Iwagoe et al. ................ 349/124
5,627,667 A * 5/1997 Mizushima et al. ......... 349/124

FOREIGN PATENT DOCUMENTS

| CN | 1178919 A | 4/1998 |
| JP | 5-45656 | 2/1993 |
| JP | 7-13168 | 1/1995 |
| KR | 1998-026045 | 7/1998 |

* cited by examiner

*Primary Examiner*—James A Dudek
(74) *Attorney, Agent, or Firm*—McKenna Long & Aldridge LLP (57) ABSTRACT

A method for forming an alignment layer for a liquid crystal display includes preparing a substrate, applying an alignment material for initial alignment of a liquid crystal, and applying a field flux (e.g., an electric or magnetic field) to the alignment material to determine the alignment direction of the alignment material. Further disclosed is an apparatus for forming an alignment layer for a liquid crystal display. The apparatus comprises a substrate stage on which a substrate is mounted, and an electric or magnetic field generator installed at the periphery of the substrate stage. According to the method and the apparatus, since the alignment direction of an alignment material is determined by using an electric or magnetic field, no physical contact with a substrate is required and thus the problem of light leakage caused by rubbing alignment is solved.

9 Claims, 11 Drawing Sheets

METHOD AND APPARATUS FOR FORMING ALIGNMENT LAYER FOR LIQUID CRYSTAL DISPLAY

This application claims the benefit of Korean Patent Application No. 10-2005-0011316, filed on Feb. 7, 2005, which is hereby incorporated by reference for all purposes as if fully set forth herein.

BACKGROUND OF THE INVENTION

1. Field of the Invention

The present invention relates to a liquid crystal display, and more specifically to an alignment layer for initial alignment of a liquid crystal in a liquid crystal display.

2. Discussion of the Related Art

Ultra-thin flat panel displays include a display screen with a thickness of not more than a few centimeters. Of these, liquid crystal displays are currently used in a wide range of applications, such as notebook computers, monitors, spacecrafts and aircraft, in terms of advantages of low power consumption due to low operating voltage and ease of portability.

A general liquid crystal display includes a color filter substrate having a color filter layer formed thereon, a thin film transistor substrate arranged opposite to the color filter substrate and having thin film transistors formed thereon, and a liquid crystal layer interposed between the two substrates.

The alignment direction of the liquid crystal layer in the liquid crystal display is varied depending on an applied voltage and thus the light transmittance is controlled, thereby displaying images on a screen. To apply a voltage, electrodes are formed on the thin film transistor substrate and the color filter substrate. Specifically, pixel electrodes are arranged on the thin film transistor substrate, and a common electrode is arranged on the color filter substrate. A vertical electric field may be applied between the two substrates (in the case of a twisted nematic (TN) mode), or a horizontal electric field may be applied after the pixel electrodes and the common electrode are arranged parallel to the thin film transistor substrate (in the case of an in-plane switching (IPS) mode).

Figure 1:
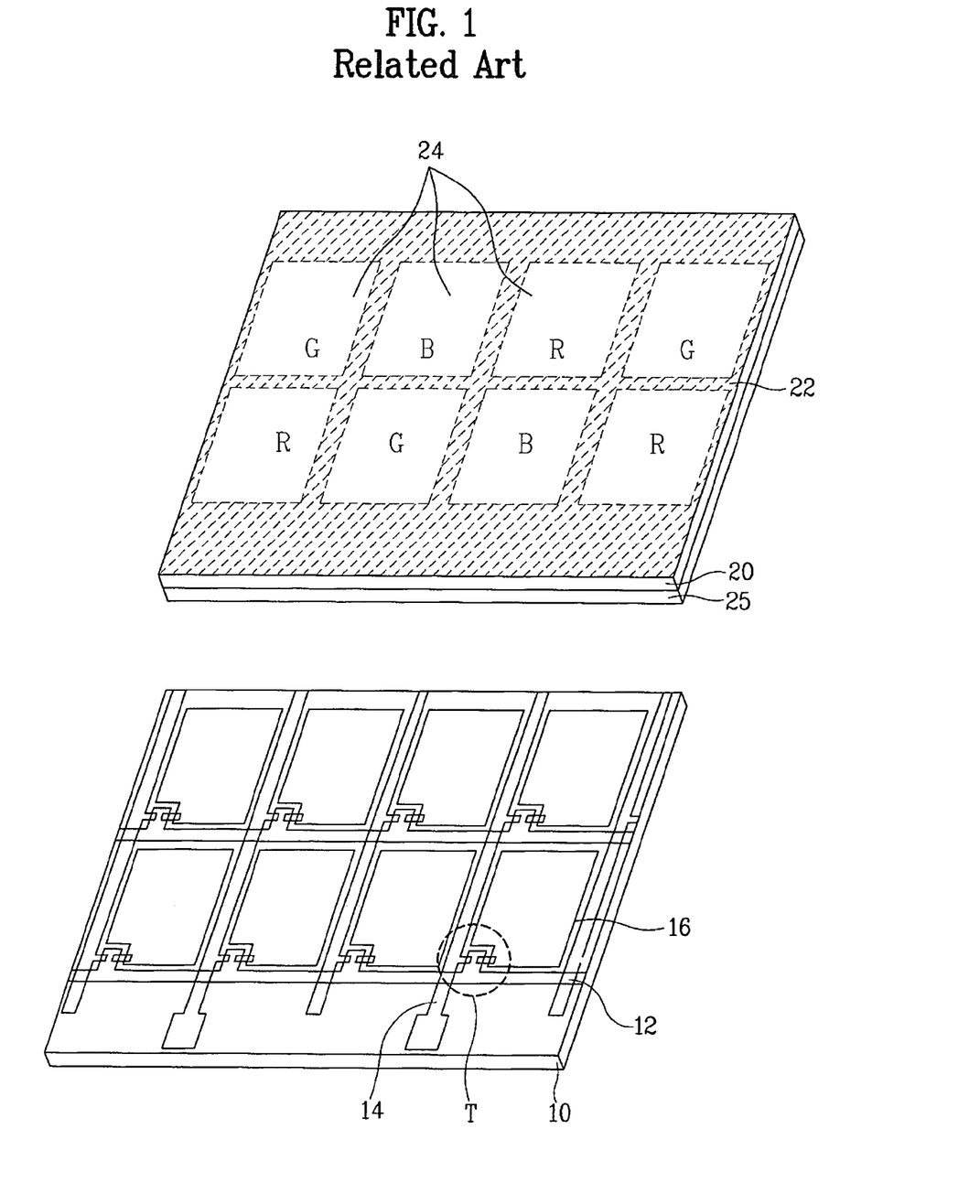
FIG. 1 is an exploded perspective view of a general liquid crystal display.

FIG. 1 is an exploded perspective view of a general TN mode liquid crystal display.

Referring to FIG. 1, gate lines 12 and data lines 14 crossing each other are formed on a thin film transistor substrate 10. Thin film transistors (T) are formed at crossings of the gate and data lines and pixel electrodes 16 are connected to the thin film transistors. In addition, a light-blocking layer 22 is formed on a color filter substrate 20 to prevent light from leaking, an RGB color filter layer 24 is formed on the light-blocking layer 22, and a common electrode 25 is formed thereon. In the case of an IPS mode, the common electrodes and the pixel electrodes are formed on the same substrate.

When a vertical electric field is generated between the pixel electrodes 16 formed on the thin film transistor substrate 10 and the common electrode 25 formed on the color filter substrate 20, the alignment direction of a liquid crystal is controlled.

Thereafter, the substrates 10 and 20 are attached to each other to form one liquid crystal panel in which a liquid crystal layer is formed between the substrates 10 and 20.

If the liquid crystal layer is randomly arranged between the substrates 10 and 20, liquid crystal molecules included in the liquid crystal layer are not arranged in a fixed direction. Although not shown in the figure, an alignment layer for initial alignment of the liquid crystal is formed between the thin film transistor substrate 10 and the color filter substrate 20.

Formation of such an alignment layer for initial alignment of a liquid crystal has predominantly been achieved by rubbing alignment.

This rubbing alignment includes the steps of applying an organic polymer, such as polyimide, to a substrate to form a thin film, curing the thin film, and rolling a rubbing roll covered with a rubbing cloth to rub the thin film organic polymer and to arrange side chains of the organic polymer in a particular direction.

A liquid crystal is aligned in the direction that the side chains of the organic polymer are arranged by the rubbing alignment. That is, the movement direction of the rubbing roll is the same as the alignment direction of the liquid crystal.

However, rubbing alignment has the following disadvantages.

Figure 2:
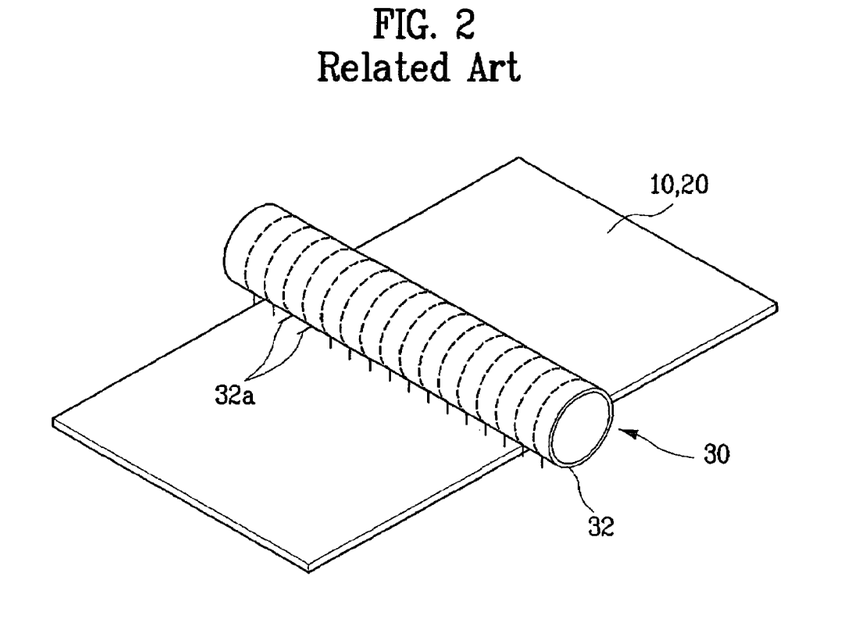
FIGS. 2 and 3 are diagrams illustrating the problems of a related art rubbing alignment method.

Firstly, when the arrangement of a rubbing cloth is non-uniform, light leakage may occur. FIG. 2 is a perspective view schematically illustrating a state wherein the arrangement of a rubbing cloth is non-uniform.

As described above, elements such as thin film transistors, color filter layers and electrode layers are formed on a substrate. As illustrated in FIG. 2, when a rubbing roll 30 is rolled on the structures formed on a substrate 20 or 30, parts 32a of a rubbing cloth 32 covering the rubbing roll 30 may be non-uniformly arranged. This non-uniform arrangement of the rubbing cloth 32 causes a non-uniform array of side chains of an organic polymer in regions of the substrate rubbed by the parts 32a of the rubbing cloth. As a result, the alignment of the liquid crystal is not uniform, thus causing light leakage.

Figure 3:
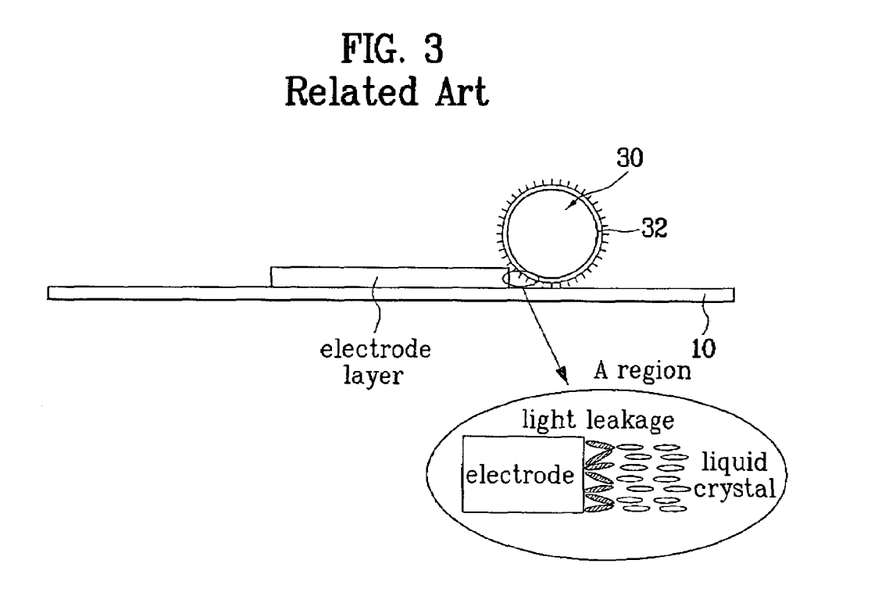

Secondly, when a rubbing cloth does not come into contact with a substrate, light leakage may occur. FIG. 3 is a perspective view schematically illustrating liquid crystal arrangement where a rubbing cloth does not come into contact with a substrate.

As explained earlier, electrode layers, such as pixel electrodes and a common electrode, are formed on a substrate. Due to a step height in electrode layers formed on a substrate 10, as illustrated in FIG. 3, a region (region "A") is formed where a rubbing cloth 32 does not come into contact with the substrate 10. In this case, the alignment of a liquid crystal is not uniform in the region ("A"), resulting in light leakage.

In conclusion, according to a related art rubbing alignment method, when the arrangement of a rubbing cloth is non-uniform or a rubbing cloth does not come into contact with a substrate, rubbing cannot be performed well, causing the problem of light leakage. Thus, there is a need for a novel liquid crystal alignment method to solve the problems of the related art rubbing alignment method.

The above-mentioned problems of the related art rubbing alignment method are attributed to physical contact between a rubbing roll and a substrate.

SUMMARY OF THE INVENTION

Accordingly, the present invention is directed to a method and an apparatus for forming an alignment layer for a liquid crystal display that substantially obviates one or more problems due to limitations and disadvantages of the related art.

An advantage of the present invention is to provide a method for forming an alignment layer without the occurrence of light leakage due to physical contact.

Another advantage of the present invention is to provide an apparatus for forming an alignment layer without the occurrence of light leakage due to physical contact.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method for forming an alignment layer for a liquid crystal display comprises the steps of preparing a substrate, applying an alignment material for initial alignment of a liquid crystal, and applying an electric or magnetic field to the alignment material to determine the alignment direction of the alignment material.

As described herein, a field flux (e.g., an electric or magnetic field) is applied to an alignment material, the alignment material is aligned in a particular direction. The present invention has been achieved based on this finding.

At this time, the alignment direction of the alignment material is identical to the direction of the electric field applied and is perpendicular to the direction of the magnetic field applied. Accordingly, it is preferred that the electric field be applied in the same direction as the alignment direction of the alignment material and the magnetic field be applied in the direction perpendicular to the alignment direction of the alignment material.

The magnetic field can be applied using an electromagnet system or a horseshoe magnet.

The step of applying an electric or magnetic field can be carried out by varying the direction of the field applied in a direction parallel, perpendicular or diagonal to the X-axis depending on the alignment direction of the alignment material. At this time, variation in the direction of the electric or magnetic field applied can be performed by rotating an electric or magnetic field generator while fixing the substrate applied with the alignment material, or rotating the substrate applied with the alignment material while fixing an electric or magnetic field generator.

Applying an alignment material and applying an electric or magnetic field to the alignment material may be carried out in a consecutive manner to shorten processing time.

In another aspect of the present invention, an apparatus for forming an alignment layer for a liquid crystal display comprises a substrate stage on which a substrate is securely mounted, and an electric or magnetic field generator installed at the periphery of the substrate stage.

The electric field generator may include an anode and a cathode opposite to the anode through the substrate stage.

The magnetic field generator may be formed in such a manner that a horseshoe magnet surrounds the substrate stage or a pair of coiled electromagnets face each other through the substrate stage.

In addition, an alignment layer applicator may be provided before the electric or magnetic field generator. In this case, the substrate stage may be moveable so as to consecutively move the substrate to the alignment layer applicator and the electric or magnetic field generator.

The electric or magnetic field generator may be rotatable so that the direction of the electric or magnetic field applied can be properly varied depending on the alignment direction of the alignment material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

As illustrated in the embodiments described herein, according to the present invention, a field flux (e.g., an electric field or a magnetic field) may be applied to an alignment layer to provide an alignment direction in accordance with the direction of the field flux.

Figure 4A:
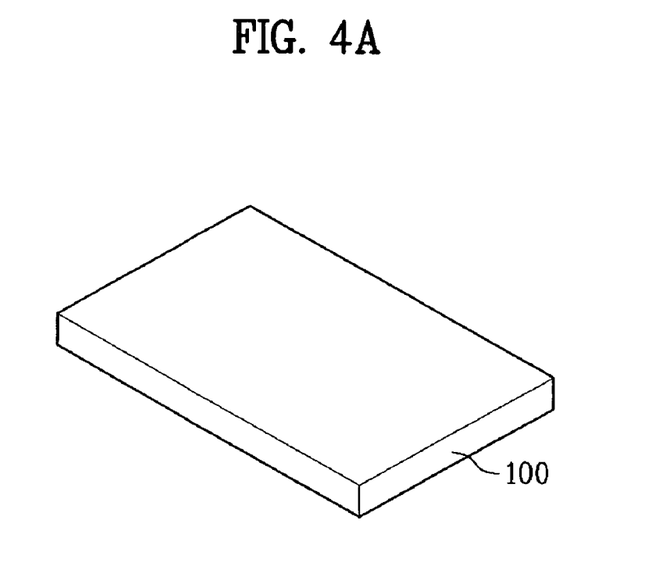
FIGS. 4A to 4C are process diagrams illustrating forming an alignment layer for a liquid crystal display according to one embodiment of the present invention.
Figure 4B:
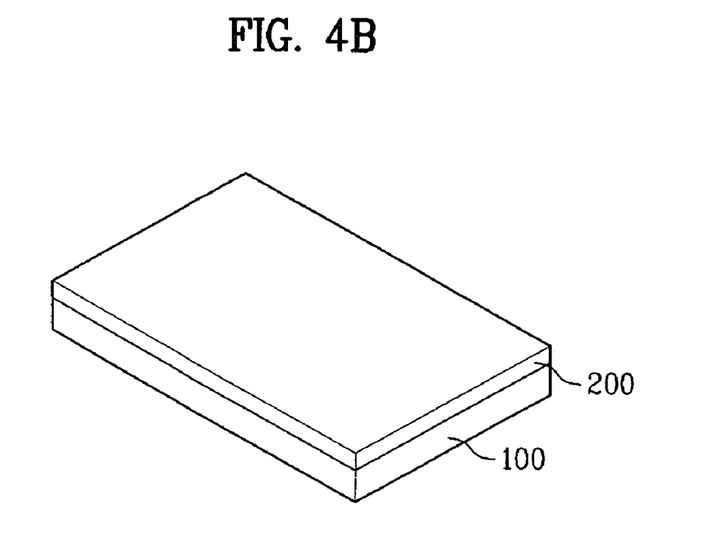
Figure 4C:
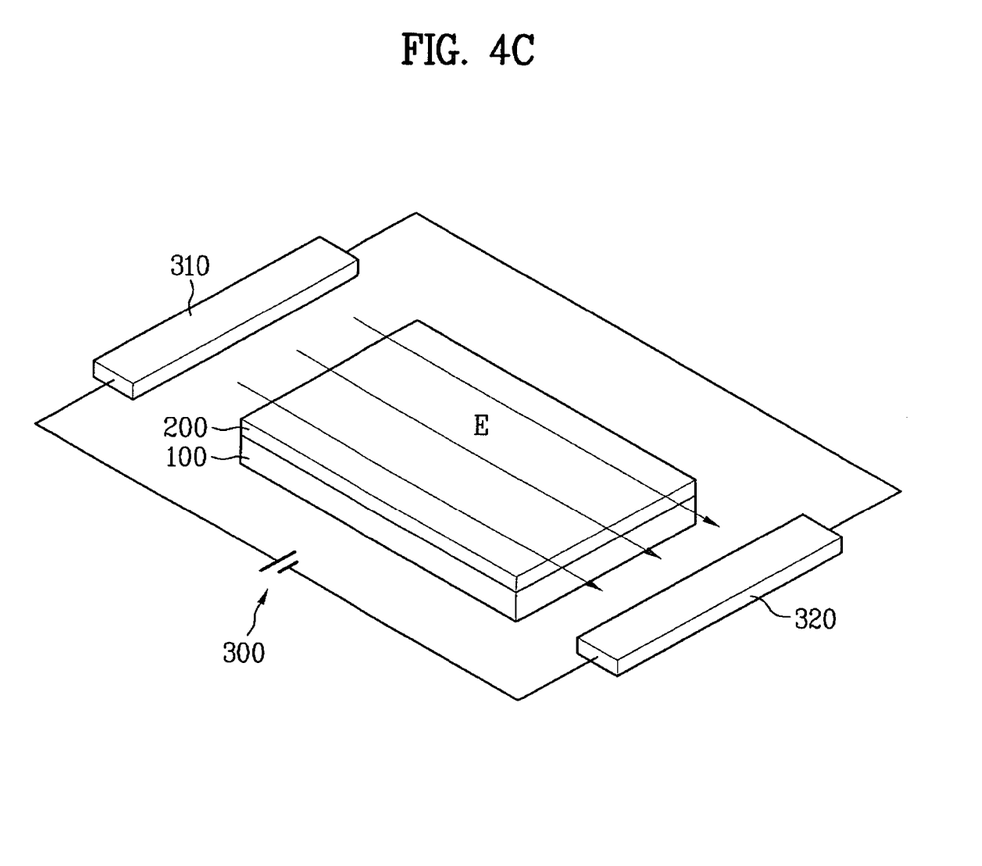

FIGS. 4A to 4C are process diagrams schematically illustrating forming an alignment layer for a liquid crystal display by application of an electric field according to one embodiment of the present invention.

First, as illustrated in FIG. 4A, a substrate 100 is prepared.

The substrate 100, as one substrate for a liquid crystal display, may be a thin film transistor substrate having thin film transistors formed thereon or a color filter substrate having color filters formed thereon. Even in the case where the substrate 100 is a thin film transistor substrate or a color filter substrate, constituent elements that can be formed on the substrate 100 may vary depending on the mode of liquid crystal displays.

For example, in the case where the substrate 100 is a thin film transistor substrate for a TN (twisted nematic) mode liquid crystal display, gate lines and data lines crossing each other on a transparent substrate are formed to define pixel regions; thin film transistors including a gate electrode, a source electrode and a drain electrode are formed at crossings of the gate lines and the data lines; and pixel electrodes are formed within the pixel regions to connect to the drain electrode of the thin film transistors.

Further, in the case where the substrate 100 is a thin film transistor substrate for an in-plane switching (IPS) mode liquid crystal display, gate lines and data lines crossing each other on a transparent substrate are formed to define pixel regions; thin film transistors including a gate electrode, a source electrode and a drain electrode are formed at crossings of the gate lines and the data lines; pixel electrodes are formed within the pixel regions to connect to the drain electrode of the thin film transistors; and a common electrode is formed substantially parallel to the pixel electrodes.

Further, in the case where the substrate 100 is a color filter substrate for a TN mode liquid crystal display, a light-blocking layer is formed on a transparent substrate to prevent light from leaking; a green/red/blue color filter layer is formed on the light-blocking layer; and a common electrode is formed on top of the color filter layer.

Further, in the case where the substrate 100 is a color filter substrate for an IPS mode liquid crystal display, a light-blocking layer is formed on a transparent substrate to prevent light from leaking; a green/red/blue color filter layer is formed on the light-blocking layer; and an overcoat layer is formed on top of the color filter layer to planarize the substrate.

Modifications and variations of the materials and formation methods of the constituent elements formed on the substrate 100 will be appreciated by those skilled in the art.

In addition to a glass substrate, a flexible substrate or a plastic substrate can also be used as the transparent substrate.

Since physical contact occurs between a rubbing roll and a substrate in related art rubbing alignment methods, the use of flexible substrates causes problems. In contrast, since the method of the present invention uses a field flux (e.g., an electric field or a magnetic field), no physical contact is caused, which will be described in detail below. Accordingly, there is no problem in using flexible substrates in the present invention.

In addition, since related art rubbing alignment methods involve the step of curing an alignment material at a high temperature of about 230° C. after application, the use of plastic substrates susceptible to heat causes bending of the plastic substrates. On the other hand, since the method of the present invention uses a field flux (e.g., an electric field or a magnetic field), the need for an additional curing step may be avoided, which will be described in detail below. Accordingly, there is no problem in using plastic substrates susceptible to heat in the present invention.

Then, as shown in FIG. 4B, an alignment material 200 is applied to the substrate.

Any material whose alignment direction is arranged by an applied electric field, which will be described below, may be used as the alignment material 200. Examples of alignment materials that can be used in the present invention include polymeric materials, for example, polyimide, polyamic acid, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate.

Then, as shown in FIG. 4C, an electric field E is applied to the alignment material 200 using an electric field generator 300 to determine the alignment direction of the alignment material 200.

The electric field generator 300 includes an anode 310 and a cathode 320 opposite to the anode through the substrate 100 applied with the alignment material 200. The electric field E is applied from the anode 310 to the cathode 320 as indicated by an arrow. Although the anode 310 and the cathode 320 do not come into contact with the substrate 100 in the figure, the anode 310 and the cathode 320 may come into contact with both sides of the substrate 100 in view of the intensity of the electric field applied.

At this time, since the alignment material 200 is aligned in the direction of the electric field applied, the electric field may be applied in the same direction as the alignment direction of the alignment material 200.

Figure 5A:
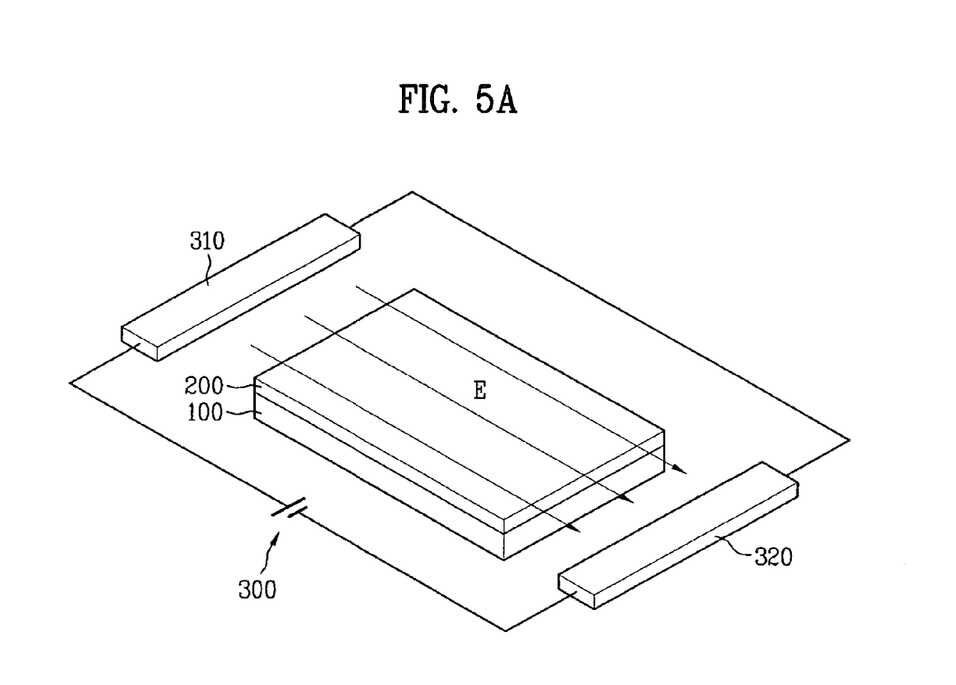
FIGS. 5A to 5C are diagrams schematically illustrating various states wherein an electric field is applied in accordance with one embodiment of the present invention.
Figure 5B:
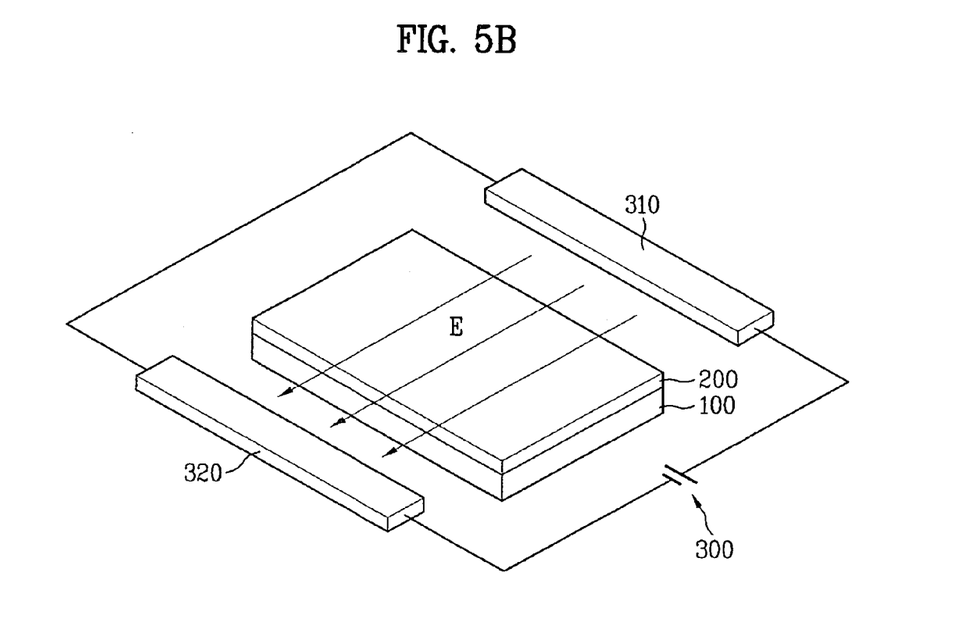

Accordingly, when the alignment direction of the alignment material 200 is direction parallel to the X-axis, an electric field may be applied in the direction parallel to the X-axis, as illustrated in FIG. 5A. Where it is desired to align the alignment material 200 in the direction perpendicular to the x axis, an electric field may be applied in the direction perpendicular to the x axis, as illustrated in FIG. 5B. Where it is desired to align the alignment material 200 in the direction diagonal to the x axis, an electric field may be applied in the direction diagonal to the x axis, as illustrated in FIG. 5C.

Figure 5C:
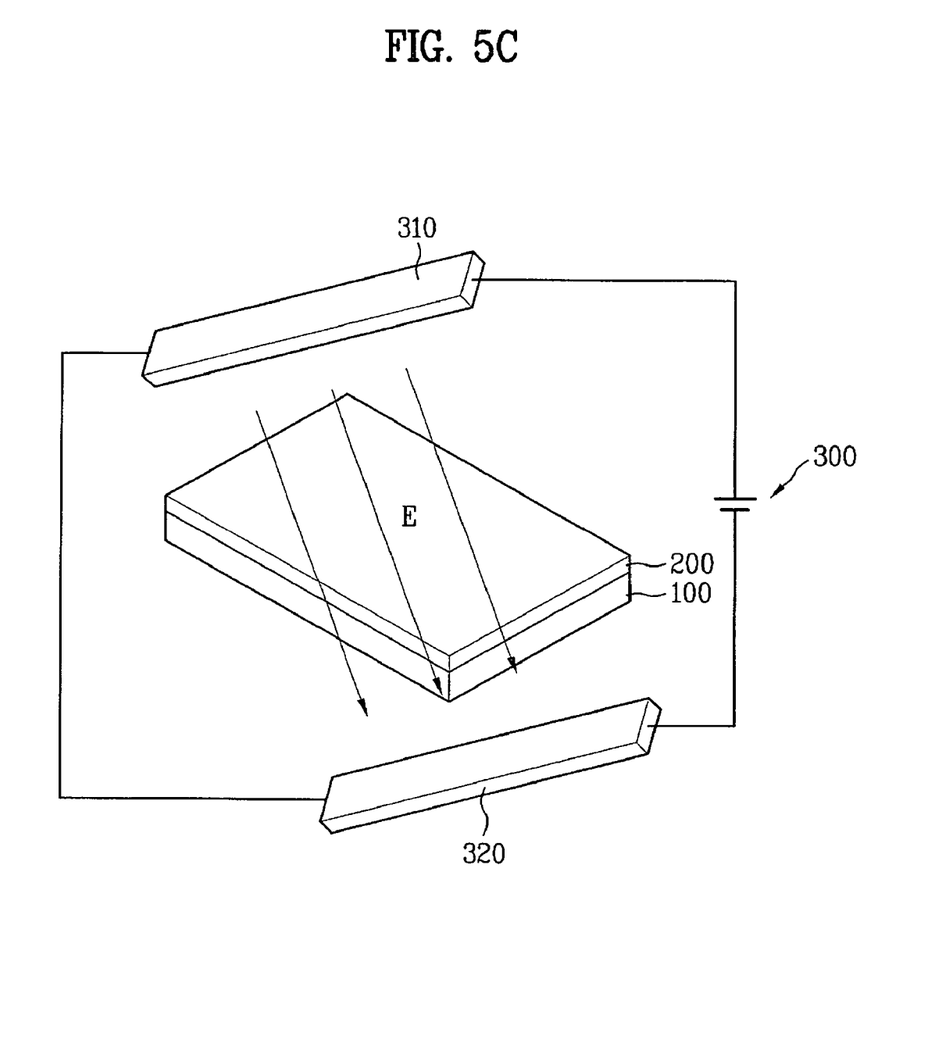

To vary the direction of the electric field applied, as illustrated in FIGS. 5A to 5C, the electric field generator 300 or the substrate 100 may be rotated.

The step of applying the alignment material 200 illustrated in FIG. 4B and the step of applying an electric field to the alignment material 200 illustrated in FIG. 4C may be carried out consecutively in consideration of shortened processing time.

Figure 6A:
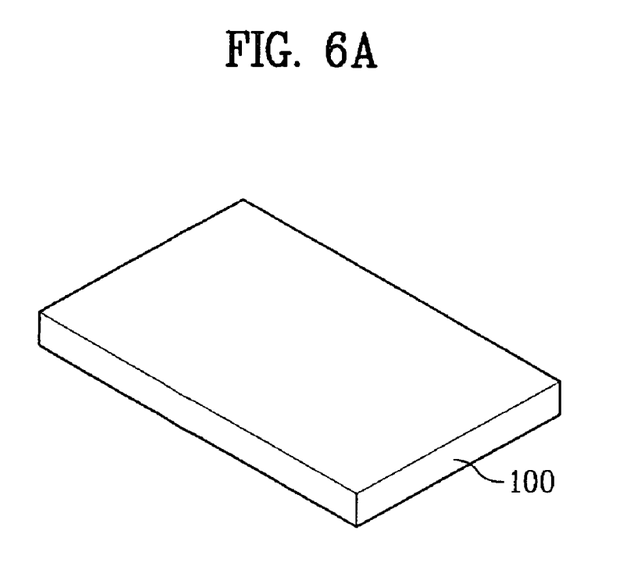
FIGS. 6A to 6C are process diagrams illustrating forming an alignment layer for a liquid crystal display according to another embodiment of the present invention.
Figure 6B:
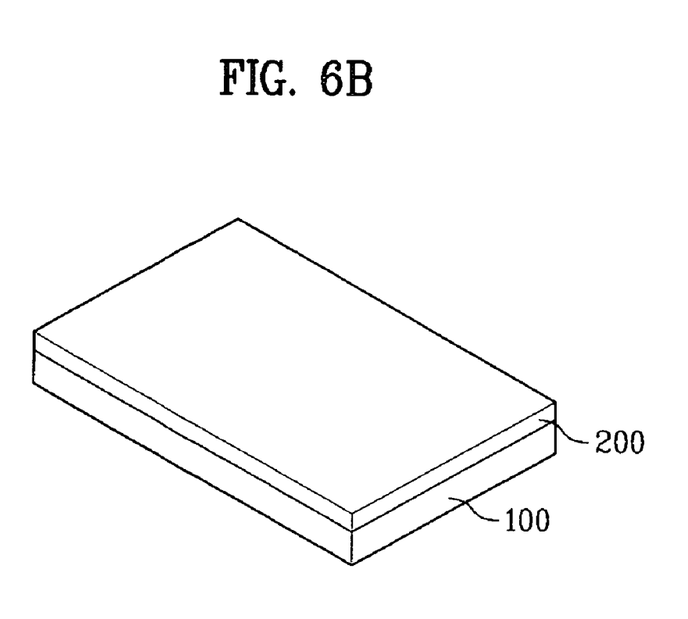
Figure 6C:
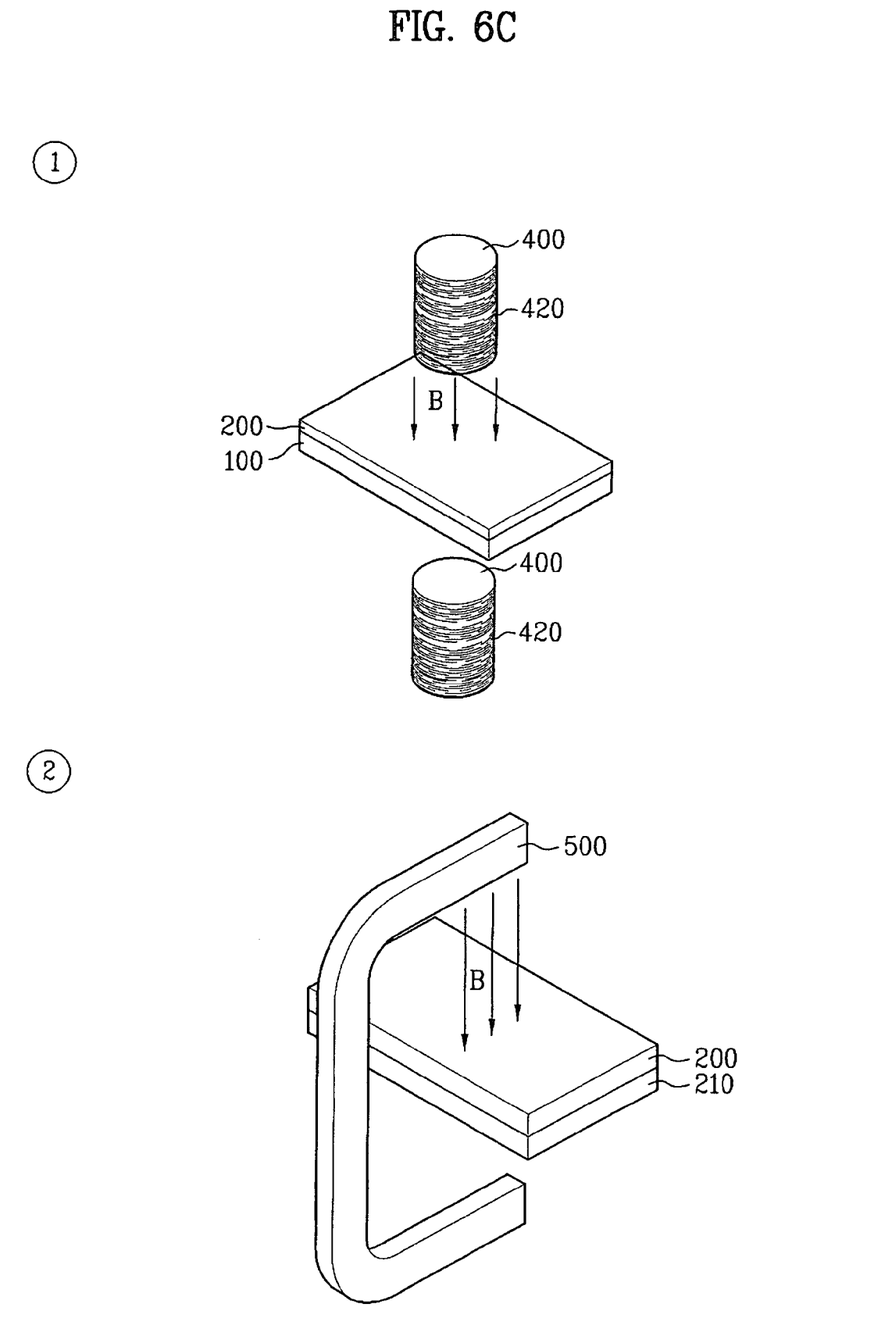

FIGS. 6A to 6C are process diagrams schematically illustrating forming an alignment layer for a liquid crystal display by application of a magnetic field according to another embodiment of the present invention.

First, as illustrated in FIG. 6A, a substrate 100 is prepared.

Constituent elements that can be formed on the substrate 100 may vary depending on the mode of liquid crystal displays, as in the previous embodiment. In addition to a glass substrate, a transparent substrate, such as a flexible substrate or a plastic substrate, can be used in the present invention.

Then, as illustrated in FIG. 6B, an alignment material 200 is applied to the substrate.

The kinds of the alignment material 200 are the same as those described in the previous embodiment.

Then, as illustrated in FIG. 6C, a magnetic field B is applied to the alignment material 200 using a magnetic field generator 400 or 500 to determine the alignment direction of the alignment material 200.

The magnetic field B can be applied using an electromagnet system in which a pair of electromagnets 400 wound with coils 420 are arranged to face each other through the substrate, as illustrated in FIG. 6C(1), or a horseshoe magnet surrounding the substrate as illustrated in FIG. 6C(2), but the present invention is not limited thereto.

No contact with the substrate is required when the magnetic field is applied in the present embodiment. Thus, productivity may be increased because the processing time may be reduced.

Since the alignment material 200 is aligned in the direction perpendicular to the direction of the magnetic field applied, the magnetic field may be applied in the direction perpendicular to the alignment direction of the alignment material 200.

To vary the direction of the magnetic field applied, the magnetic field generator 400 or 500 or the substrate 100 may be rotated.

The step of applying the alignment material 200 illustrated in FIG. 6B and the step of applying a magnetic field to the alignment material 200 illustrated in FIG. 6C are may be carried out consecutively in consideration of shortened processing time.

Figure 7:
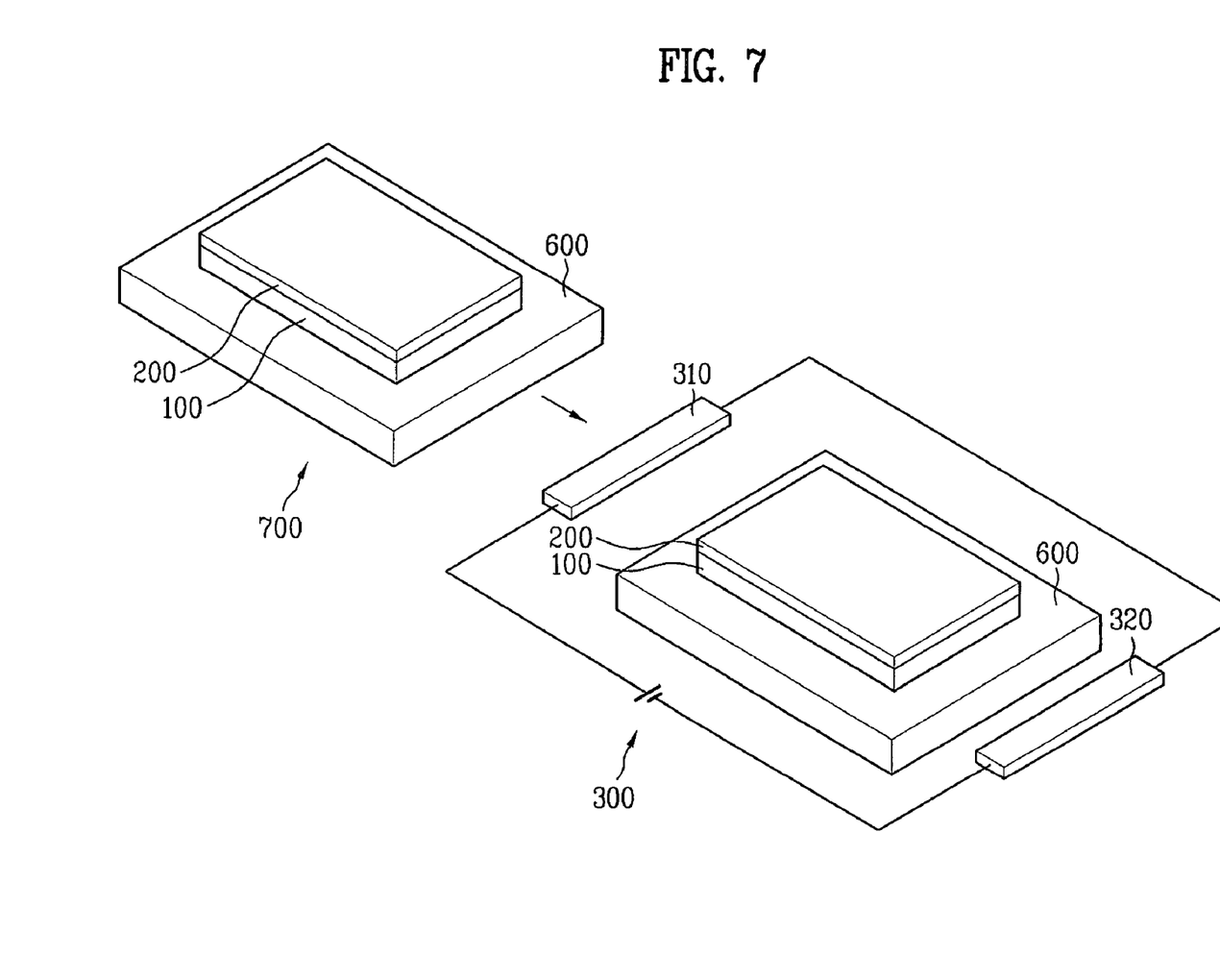
FIG. 7 schematically illustrates an apparatus for forming an alignment layer for a liquid crystal display according to one embodiment of the present invention.

FIG. 7 schematically illustrates an apparatus for forming an alignment layer for a liquid crystal display by application of an electric field according to one embodiment of the present invention.

The apparatus of the present embodiment includes a substrate stage 600 on which a substrate is mounted, and an electric field generator 300 installed at the periphery of the substrate stage 600.

The electric field generator 300 includes an anode 310 and a cathode 320 opposite to the anode through the substrate stage 600. An electric field is applied to a substrate 100 mounted on the substrate stage 600. Before the application of the electric field, an alignment material 200 is applied to the substrate 100.

The apparatus of the present embodiment further includes an alignment layer applicator 700 arranged before the electric field generator 300, as illustrated schematically in FIG. 7. The substrate stage 600 may be moveable to consecutively move the substrate to the alignment layer applicator 700 and the electric field generator 300.

The alignment layer applicator 700 may be a printing system, but is not limited thereto.

The electric field generator 300 may be rotatable so that the direction of the electric field applied can be properly varied depending on the alignment direction of the alignment material 200.

Figure 8:
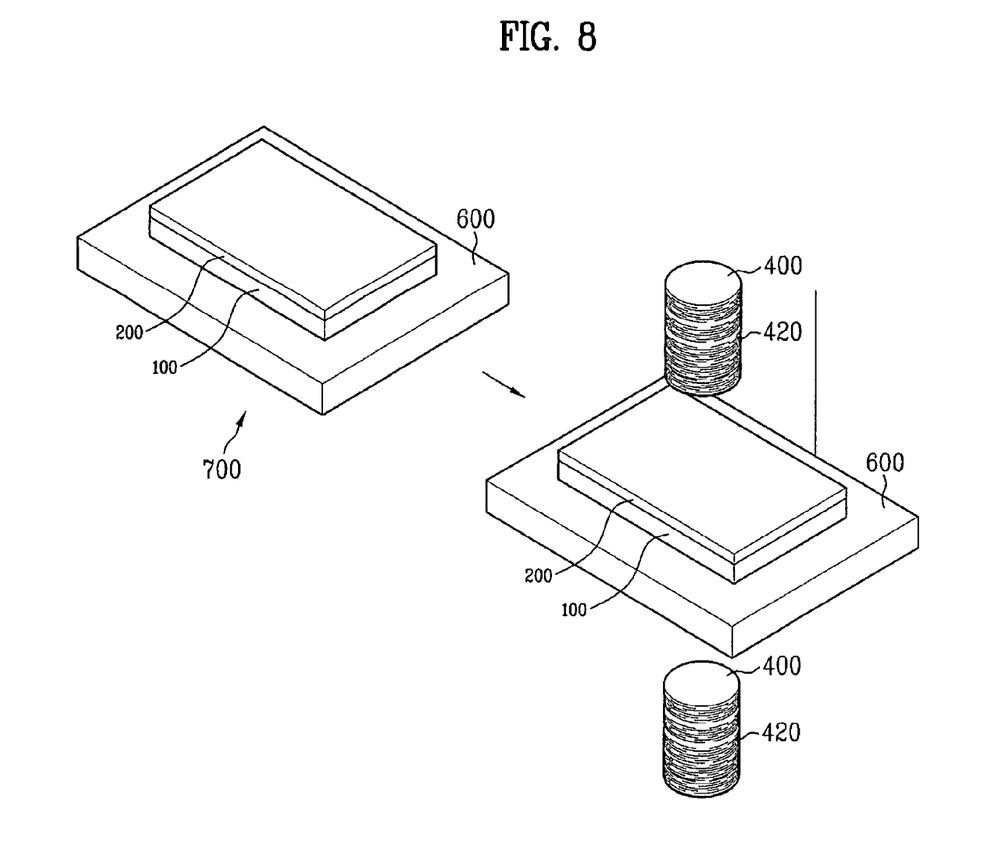
FIG. 8 schematically illustrates an apparatus for forming an alignment layer for a liquid crystal display according to another embodiment of the present invention.
Figure 9:
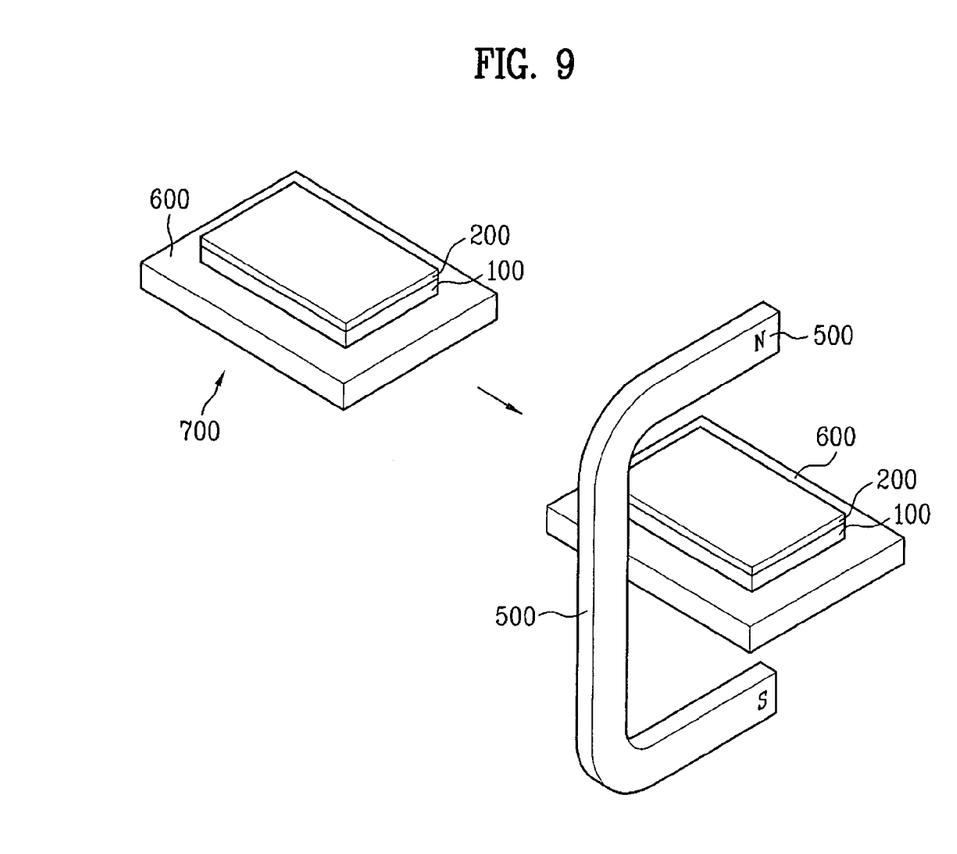
FIG. 9 schematically shows an apparatus for forming an alignment layer for a liquid crystal display according to another embodiment of the present invention.

FIGS. 8 and 9 schematically illustrate apparatuses for forming an alignment layer for a liquid crystal display by application of a magnetic field according to another embodiment of the present invention.

The apparatus of the present embodiment may include a substrate stage 600 on which a substrate is smounted, and a magnetic field generator 400 or 500 installed at the periphery of the substrate stage 600.

The magnetic field generator may be an electromagnet system 500 in which a pair of electromagnets 400 wound with coils 420 are arranged to face each other through the substrate as illustrated in FIG. 8, or a horseshoe magnet 500 surrounding the substrate as illustrated in FIG. 9, but the present invention is not limited to these structures. Any apparatus can be used so long as it can generate a magnetic field.

The apparatus of the present embodiment further includes an alignment layer applicator 700 arranged before the magnetic field generator 400 or 500, as schematically illustrated in FIGS. 8 and 9. The substrate stage 600 may be moveable formed so as to consecutively move the substrate to the alignment layer applicator 700 and the magnetic field generator 400 or 500.

The alignment layer applicator 700 may be a printing system, but is not limited thereto.

The magnetic field generator 400 or 500 may be rotatable so that the direction of the magnetic field applied can be properly varied depending on the alignment direction of the alignment material.

As apparent from the above description, according to the present invention, since the alignment direction of an alignment material is determined by using a field flux (e.g., an electric or magnetic field), no physical contact with a substrate is required and thus the problem of light leakage caused by rubbing alignment can be solved.

In addition, since the method and the apparatus of the present invention use an electric or magnetic field, additional curing of an alignment material is not required. Accordingly, plastic substrates susceptible to heat as well as flexible substrates can be used in the present invention.

Furthermore, since the steps of applying an alignment material and applying electric or magnetic field to the alignment material can be carried out in a consecutive manner, processing time is shortened.

Moreover, since the electric or magnetic field generator used in the present invention can be rotated, the alignment direction of an alignment material can be freely varied.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for forming an alignment layer for a liquid crystal display, comprising:
   preparing a substrate;
   applying an alignment material to the substrate; and
   applying an electric field to the alignment material to determine the alignment direction of the alignment material by using an electric field generator including an anode and a cathode opposite to the anode through the substrate, wherein the anode and the cathode come into contact with both sides of the substrate,
   wherein the electric field is applied in the same direction as the alignment direction of the alignment material, and
   wherein changing the alignment direction of the alignment material is performed by rotating the electric field generator while maintaining the substrate stationary or performed by rotating the substrate while maintaining the electric field generator stationary.

2. The method according to claim 1, wherein the steps of applying an alignment material and applying the electric field to the alignment material are performed consecutively.

3. The method according to claim 1, wherein preparing a substrate comprises forming gate lines and data lines crossing each other on a transparent substrate so as to define pixel regions; forming thin film transistors including a gate electrode, a source electrode and a drain electrode at crossing of the gate lines and the data lines; and forming pixel electrodes connecting to the drain electrode of the thin film transistors.

4. The method according to claim 1, wherein preparing a substrate comprises forming gate lines and data lines crossing each other on a transparent substrate so as to define pixel regions; forming thin film transistors including a gate electrode, a source electrode and a drain electrode at crossings of the gate lines and the data lines; forming pixel electrodes connecting to the drain electrode of the thin film transistors; and forming a common electrode parallel to the pixel electrodes.

5. The method according to claim 1, wherein preparing a substrate comprises forming a light-blocking layer on a transparent substrate to prevent light from leaking; forming a green/red/blue color filter layer on the light-blocking layer; and forming a common electrode on top of the color filter layer.

6. The method according to claim 1, wherein preparing a substrate comprises forming a light-blocking layer on a transparent substrate to prevent light from leaking; forming a green/red/blue color filter layer on the light-blocking layer; and forming an overcoat layer on top of the color filter layer.

7. The method according to claim 1, wherein the substrate is a plastic substrate.

8. The method according to claim 1, wherein the substrate is a flexible substrate.

9. The method according to claim 1, wherein the alignment material is a polymeric material selected from the group consisting of polyimide, polyamic acid, polyvinylcinnamate, polyazobenzene, polyethyleneimine, polyvinyl alcohol, polyamide, polyethylene, polystyrene, polyphenyleneph-thalamide, polyester, polyurethane, and polymethyl methacrylate.

* * * * *